US012756882B2

(12) United States Patent
Xiao et al.

(10) Patent No.: US 12,756,882 B2
(45) **Date of Patent: *Oct. 6, 2026**

(54) RECOMMENDATION SYSTEM WITH REDUCED BIAS BASED ON A VIEW HISTORY

(71) Applicant: ROKU, INC., San Jose, CA (US)

(72) Inventors: Fei Xiao, San Jose, CA (US); Zidong Wang, San Jose, CA (US); Jose Sanchez, San Jose, CA (US); Abhishek Bambha, Burlingame, CA (US); Ronica Jethwa, Mountain View, CA (US)

(73) Assignee: ROKU, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/988,182

(22) Filed: Dec. 19, 2024

(65) Prior Publication Data

US 2025/0133251 A1 Apr. 24, 2025

Related U.S. Application Data

(63) Continuation of application No. 17/890,491, filed on Aug. 18, 2022, now Pat. No. 12,219,190.

(51) Int. Cl.
*H04N 21/25* (2011.01)
*H04N 21/258* (2011.01)

(52) U.S. Cl.
CPC ..... *H04N 21/252* (2013.01); *H04N 21/25891* (2013.01)

(58) Field of Classification Search
CPC ........................ H04N 21/252; H04N 21/25891
See application file for complete search history.

(56) References Cited

U.S. PATENT DOCUMENTS

| | | | | |
|---|---|---|---|---|
| 10,671,670 | B2* | 6/2020 | Wright | G06F 16/24578 |
| 11,172,262 | B2* | 11/2021 | Grover | H04N 21/4355 |
| 2015/0278351 | A1* | 10/2015 | Messina | G06F 16/48 707/749 |
| 2017/0228382 | A1* | 8/2017 | Haviv | G06Q 30/0631 |
| 2019/0392330 | A1* | 12/2019 | Martineau | G06N 5/04 |
| 2021/0281892 | A1* | 9/2021 | Grover | H04N 21/44 |
| 2022/0188899 | A1* | 6/2022 | Malhotra | G06Q 30/0631 |
| 2024/0064354 | A1 | 2/2024 | Xiao et al. | |

* cited by examiner

*Primary Examiner* — Nathan J Flynn
*Assistant Examiner* — Christine A Kurien
(74) *Attorney, Agent, or Firm* — Sterne, Kessler, Goldstein & Fox P.L.L.C.

(57) ABSTRACT

Disclosed are mechanisms for selecting a recommended item for a current item being viewed by a user account based on a view history of the user account with reduced bias. For a current item being viewed by the user account represented by a current node of a co-watch graph, embodiments can select a recommended item represented by an associated node in the co-watch graph likely being viewed by the user account, and determine a probability of the recommended item likely being viewed. The co-watch graph can be generated based on a view history of the user account. An edge between a first node and a second node of the co-watch graph can have a weight representing a number of co-occurrence times when the first item represented by the first node and the second item represented by the second node are viewed in sequence within a predetermined time interval.

20 Claims, 6 Drawing Sheets

RECOMMENDATION SYSTEM WITH REDUCED BIAS BASED ON A VIEW HISTORY

CROSS-REFERENCE TO RELATED APPLICATION

This application is a continuation of U.S. patent application Ser. No. 17/890,491, filed Aug. 18, 2022, which is issued as U.S. Pat. No. 12,219,190 on Feb. 4, 2025, which is incorporated herein by reference in its entirety.

BACKGROUND

Field

This disclosure is generally directed to generating a recommendation with reducing bias including reducing popularity bias when generating a recommendation for a media item to be watched based on a view history of a user account.

Background

A recommendation system, such as a content-based recommendation system, can recommend items to a user by using the similarity of items. Generally, the recommendation system can recommend products or items based on their description or features. The recommendation system can identify the similarity between the products or items based on their descriptions. However, current recommendation systems often suffer from various bias such as popularity bias, family bias, position bias, or multiple interest and interest shift bias. Recommendations made by the recommendation system can be affected by the popular demand of an item by the general public or society, which may not reflect the real interests of a user.

SUMMARY

Provided herein are system, apparatus, article of manufacture, method and/or computer program product embodiments, and/or combinations and sub-combinations thereof, for generating a recommendation to select a recommended item for a current item being viewed by a user account based on a view history of the user account with reduced bias. In detail, for a current item being viewed by the user account represented by a current node of a co-watch graph, embodiments can select a recommended item represented by an associated node in the co-watch graph likely being viewed by the user account, and determine a probability of the recommended item likely being viewed. The co-watch graph can be generated based on a view history of the user account, where the co-watch graph includes a plurality of nodes including a first node corresponding to a first item being viewed by the user account, a second node corresponding to a second item being viewed by the user account, and an edge between the first node and the second node when the first item and the second item are viewed in sequence within a predetermined time interval. Such an edge between the first node and the second node can have a weight representing a number of co-occurrence times when the first item and the second item are viewed in sequence within the predetermined time interval. Such a weight of the edge can help to reduce the family bias or the popularity bias related to the general popularity of the items being viewed by the general public instead of being viewed by the user account.

An example embodiment of a computing device can include at least one processor configured to perform various operations of a recommendation system. In an example, the at least one processor can be configured to generate a co-watch graph based on a view history of a user account stored in a storage device accessible by the at least one processor. The co-watch graph comprises a plurality of nodes including a first node corresponding to a first item being viewed by the user account, a second node corresponding to a second item being viewed by the user account, and an edge between the first node and the second node when the first item and the second item are viewed in sequence within a predetermined time interval. Afterwards, the at least one processor can be configured to assign an initial node weight of the first node to the first node representing a first number of times the first item has been viewed by the user account, assign an initial node weight of the second node to the second node representing a second number of times the second item has been viewed by the user account, and assign an initial weight of the edge to the edge between the first node and the second node representing a number of co-occurrence times when the first item and the second item are viewed in sequence within the predetermined time interval. In addition, the at least one processor can be configured to adjust the initial weight of the edge to remove bias to derive a normalized weight of the edge based on the initial weight of the edge, the initial node weight of the first node, and the initial node weight of the second node. Once the co-watch graph has been constructed with the normalized weight of the edge, for a current item being viewed by the user account represented by a current node of the co-watch graph, the at least one processor can be configured to select, based on the co-watch graph with the edge having the normalized weight, a recommended item represented by an associated node in the co-watch graph likely being viewed by the user account, and determine a probability of the recommended item likely being viewed.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A recommendation system, such as a content-based recommendation system, can recommend items to a user by using the similarity of items. A recommendation system may be referred by other names, such as a recommender system, while an item can be a media item including a movie, a media clip, an advertisement segment, a photo, or any other media format. In addition, mechanisms presented in the current description can be applicable to other items such as a product in a catalog. Generally, a recommendation system can use a machine learning model to recommend products or items most relevant according to a user's interests.

However, current recommendation systems often suffer from various bias such as popularity bias, family bias, position bias, or multiple interest and interest shift bias. Recommendations made by the recommendation system can be affected by the popular demand of an item by the general public or society, which may not reflect the real interests of a user. In addition, a user account shared among multiple users such as different family members can have inaccurate information about a specific viewer or user interests. Various bias such as the popularity bias and family bias can reduce the accuracy for the recommendation made by a recommendation system.

Embodiments herein address the above issues by presenting techniques and mechanisms for making a recommendation for a current item being viewed by a user account based on a view history of the user account with reduced bias. In detail, the recommendation may be made using a co-watch graph, where nodes of the co-watch graph can represent items being viewed, and an edge of the co-watch graph can represent a weight of two items being viewed in sequence within a predetermined time interval. The more often two items have been viewed in sequence within a predetermined time interval, the more likely the two items are viewed by a same user. Accordingly, techniques based on the co-watch graph can reduce the family bias or popularity bias. To further reduce the popularity bias, a corpus including a plurality of items being viewed by a plurality of additional user accounts may be used to determine the probability of an item likely being viewed.

Figure 1:
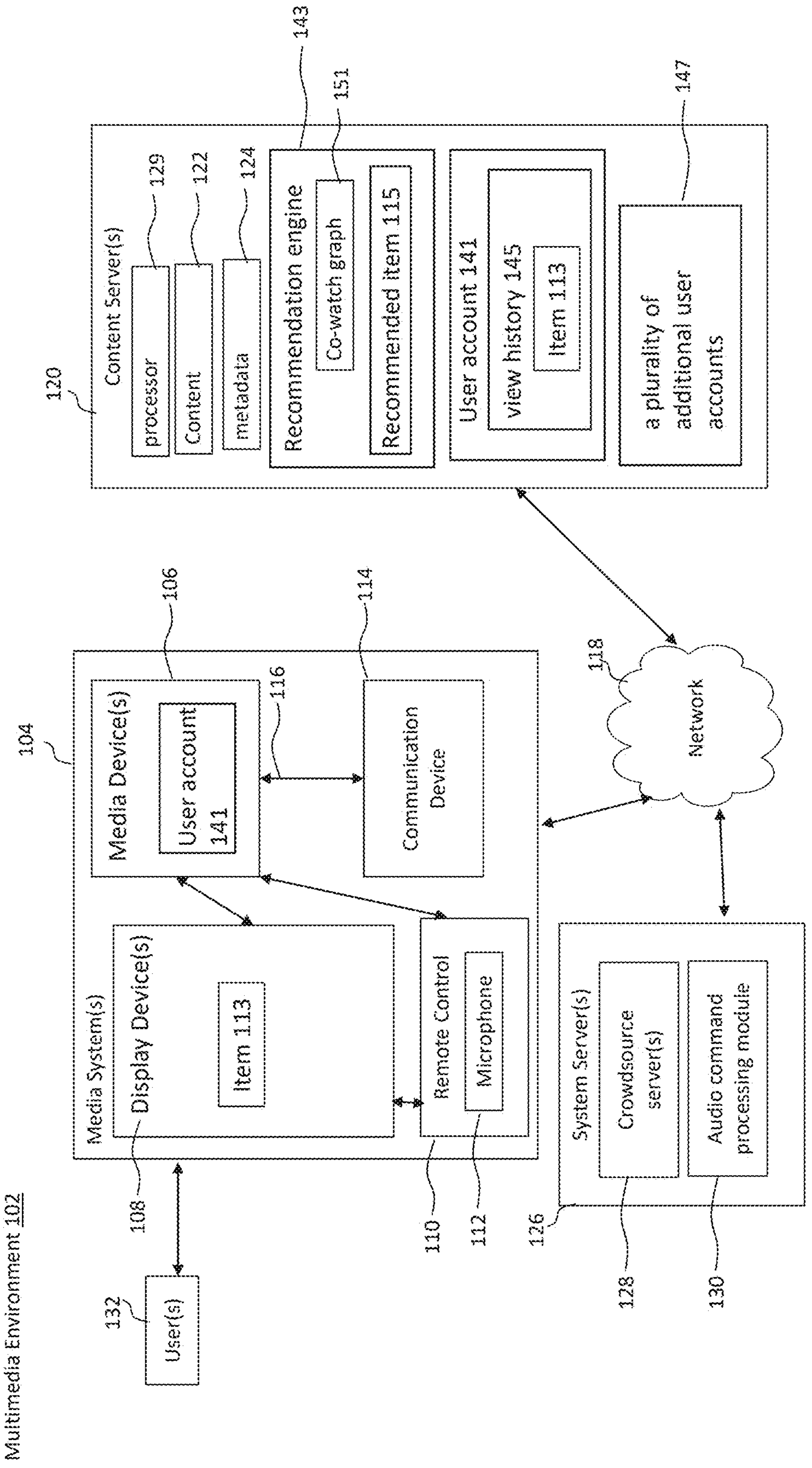
FIG. 1 illustrates a block diagram of a multimedia environment including a recommendation engine to make a recommendation for a current item being viewed by a user account, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102 including a recommendation engine to make a recommendation for a current item being viewed by a user account, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play media content item, e.g., item 113, which can be a current item being viewed by a user account. Various users, such as one or more user 132 may operate with media system 104 to select and consume content such as item 113.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content, such as item 113, to display device 108.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, or display device 108 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may include a controller or one or more processor 129, and a memory or storage device to store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for item 113 displayed on display device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

In some embodiments, content server 120 may manage a plurality of media accounts or user accounts, e.g., user account 141 that is associated with media device 106, and a plurality of additional user accounts 147. A user account, such as user account 141, may be shared and accessible among multiple users, such as one or more members of a household. User account 141 may have a view history 145 of the user account 141, where view history 145 can include item 113 being presented on display device 108. Content server 120 may further include a recommendation engine 143 that can recommend an item 115 to be watched after item 113 has been viewed. Recommendation engine 143 may be referred as a recommendation system, a recommender system, or any other names known to one having ordinary skills in the art. In some embodiments, recommendation engine 143 may be based on a co-watch graph 151, which are shown in more details in FIG. 3, and FIGS. 4A-4D. More details of operations of recommendation engine 143 are illustrated and described in FIG. 3, and FIGS. 4A-4D.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users, watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie. In some embodiments, crowdsource server(s) 128 can be located at content server 120. In some embodiments, some part of content server 120 functions can be implemented by system server 126 as well.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
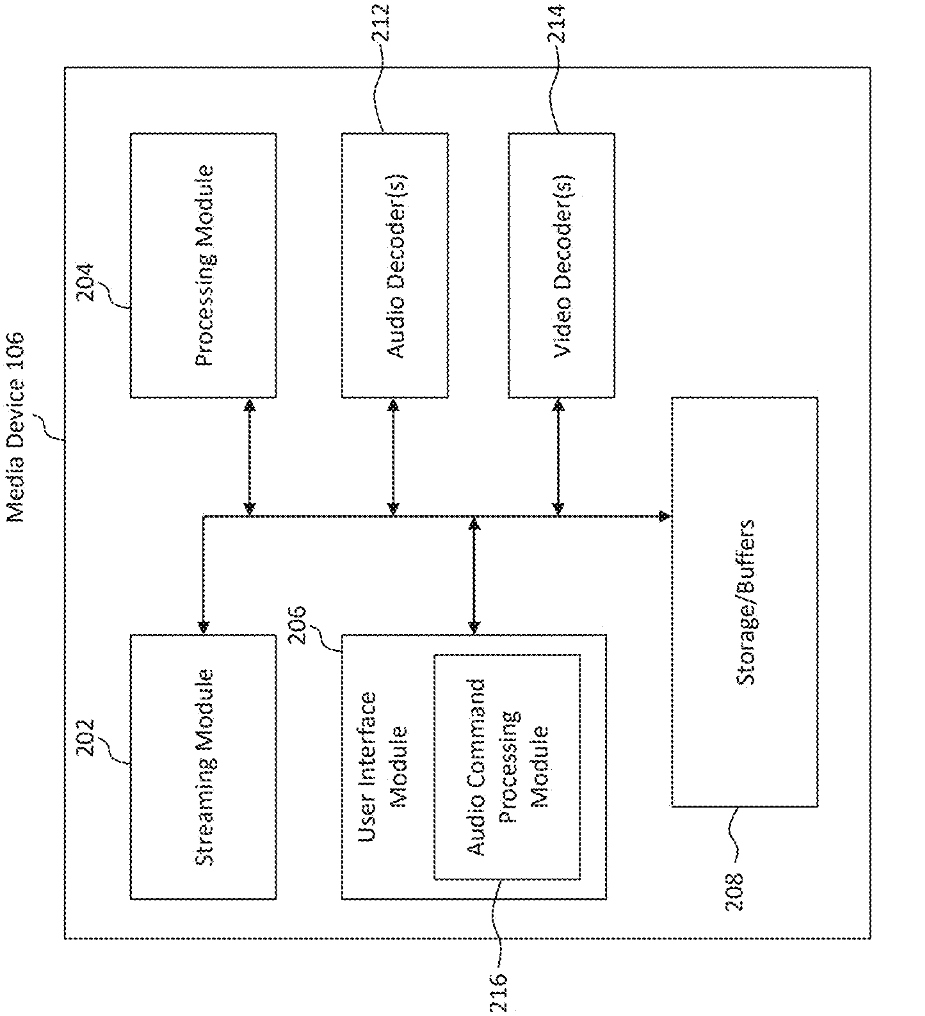
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Recommendation Engine

Figure 3:
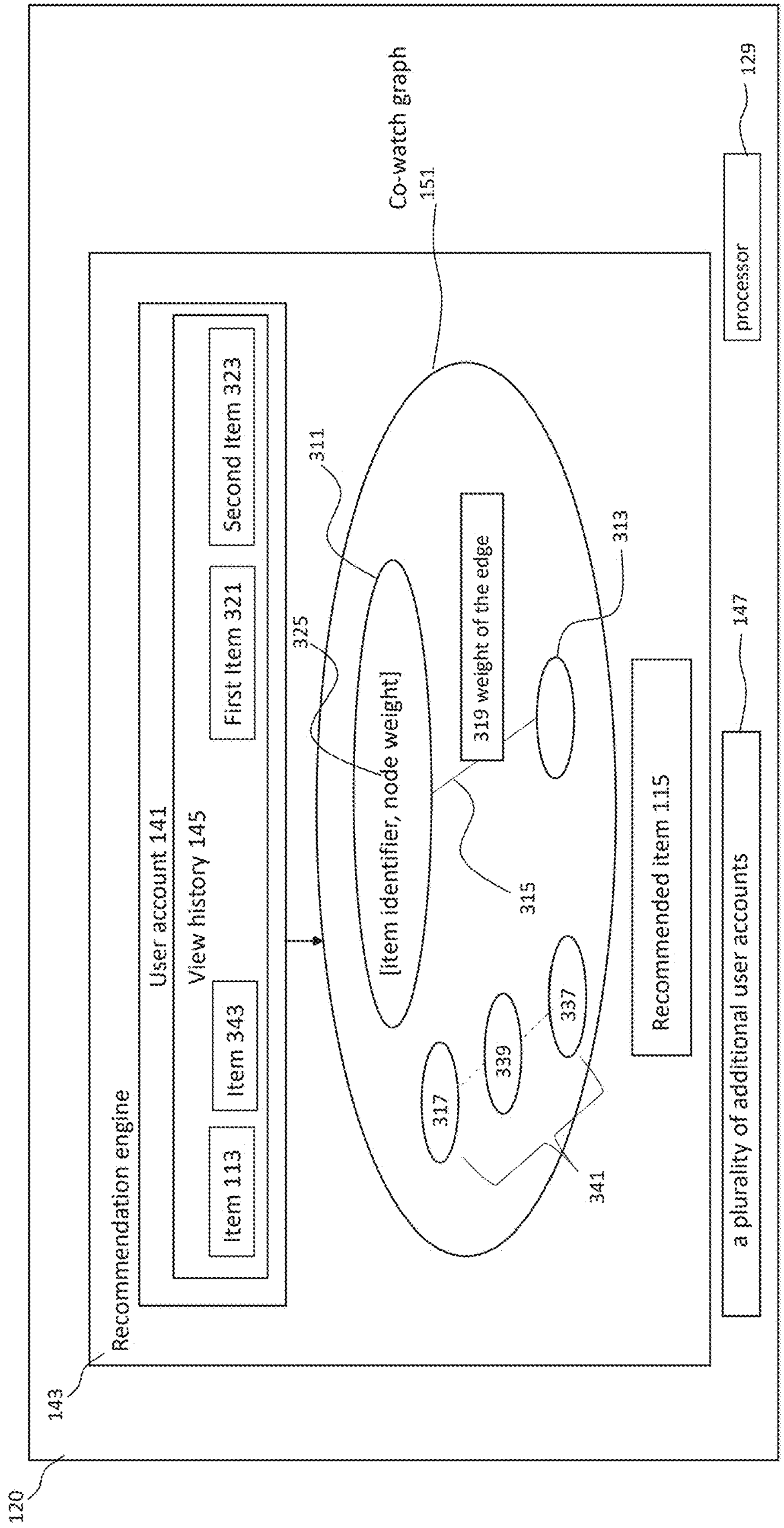
FIG. 3 illustrates an example content server including a recommendation engine to make a recommendation for a current item being viewed by a user account, according to some embodiments.

FIG. 3 illustrates an example content server 120 including recommendation engine 143 to make a recommendation and generate a recommended item 115 for the current item 113 being viewed by a user account 141, according to some embodiments. In some embodiments, functions described herein can be implemented in an independent computing device instead of being implemented on server 120. Operations performed by recommendation engine 143 may be performed by one or more processor 129.

Figure 4A:
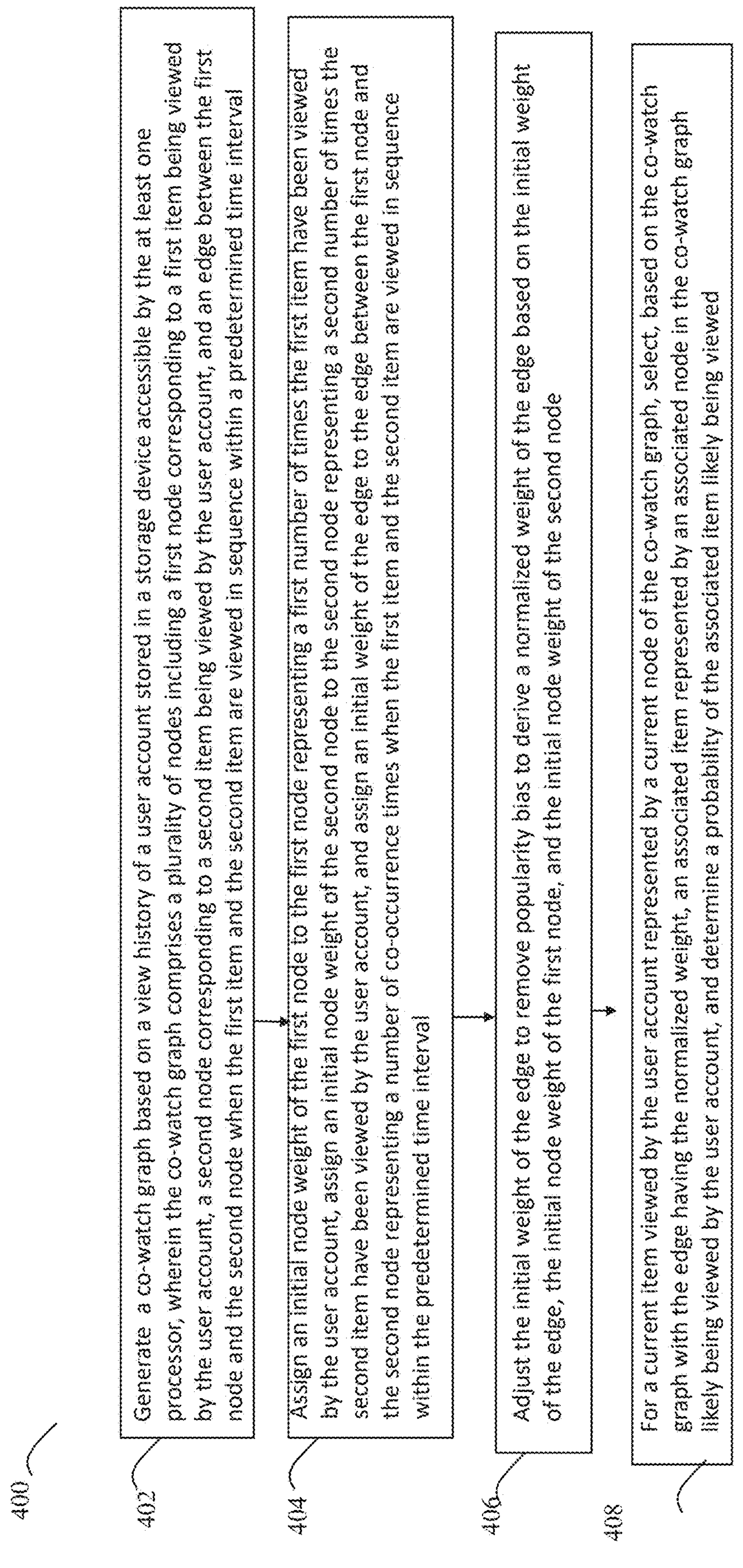
FIGS. 4A-4D illustrate an example process performed by a computing device to make a recommendation for a current item being viewed by a user account, according to some embodiments.
Figure 4B:
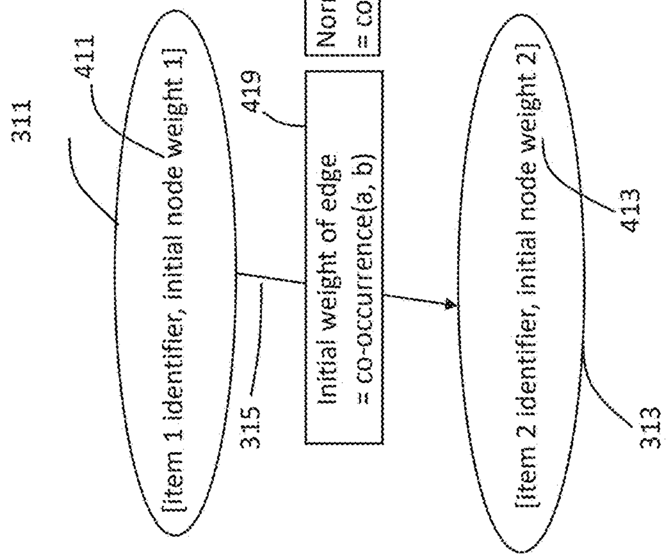
Figure 4C:
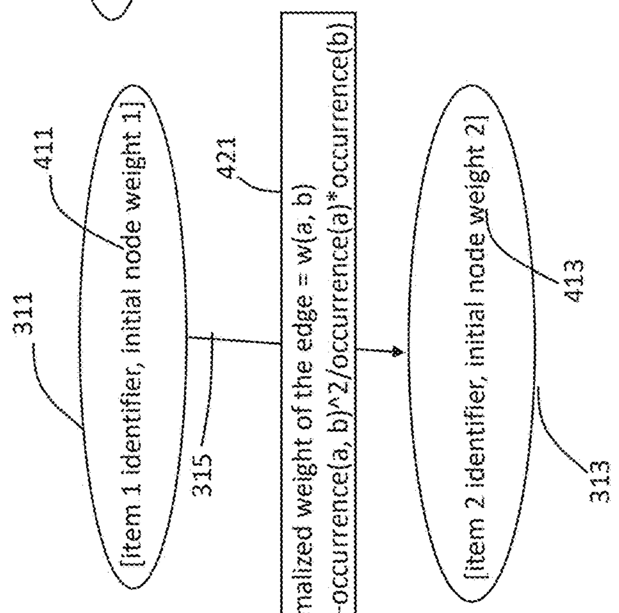
Figure 4D:
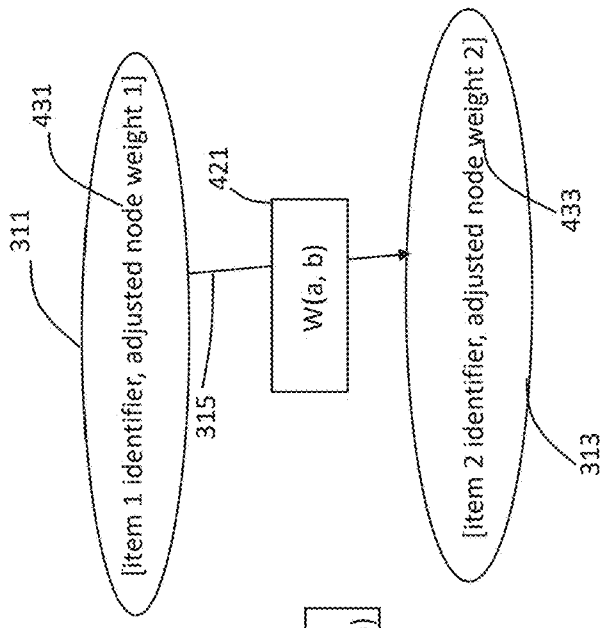

In some embodiments, processor 129 can be configured to operate recommendation engine 143 to perform a process 400 as shown in FIG. 4A. Processes 400 can be performed by processing logic that can comprise hardware (e.g., circuitry, dedicated logic, programmable logic, microcode, etc.), software (e.g., instructions executing on a processing device, such as by one or more processor 129), or a combination thereof. It is to be appreciated that not all steps may be needed to perform the disclosure provided herein. Further, some of the steps may be performed simultaneously, or in a different order than shown in FIG. 4A, as will be understood by a person of ordinary skill in the art. FIGS. 4B-4D illustrate more details of process 400 performed by recommendation engine 143.

According to process 400, at 402, recommendation engine 143 can generate co-watch graph 151 based on view history 145 of user account 141 stored in a storage device accessible by the one or more processor 129, as shown in FIG. 3. Co-watch graph 151 can include a plurality of nodes including a current node 317 corresponding to item 113, a first node 311 corresponding to a first item 321 being viewed by the user account 141, a second node 313 corresponding to a second item 323 being viewed by the user account 141. A node can include an item identifier to identify the corresponding item. For example, the first node 311 can include an item identifier for the first item 321. In addition, the first node 311 and the second node 313 can have a mechanism to record the time when the first item 321 or the second item 323 is viewed. When the first item 321 is viewed before the second item 323 being viewed by the user account, the first node 311 is a part of a context of the second node 313.

In some embodiments, a node can further include a node weight, which can be a number to represent the relative frequency of the corresponding item represented by the node being viewed by the user account. For example, the first node 311 includes a node weight 325, which can be an initial node weight or an adjusted node weight, with details shown below.

In some embodiments, co-watch graph 151 can include an edge 315 between the first node 311 and the second node 313 when the first item 321 and the second item 323 are viewed in sequence within a predetermined time interval. In some embodiments, the predetermined time interval can be within a two hour time window, 1 hour time window, or a time window longer than 2 hours, or shorter than 1 hour, based on the applications. Instead of using a user's view history for the past few days for building a graph, co-watch graph 151 only includes edges representing items being viewed in sequence within a predetermined time interval in a shorter time interval, e.g., less than a day. Such a shorter time interval can reduce or remove the various bias, such as family bias and or multi-interest bias.

In some embodiments, the user account 141 can be shared among multiple users, and the view history 145 of the user account 141 can be a collection of a view history of each user of the multiple users, and the first item 321 being viewed by user account 141 can be viewed by any user of the multiple users of user account 141.

At 404, as shown in FIG. 4B, recommendation engine 143 can assign an initial node weight 411 of the first node to the first node 311 representing a first number of times the first item 321 has been viewed by the user account 141, assign an initial node weight 413 of the second node to the second node 313 representing a second number of times the second item 323 has been viewed by the user account 141, and assign an initial weight 419 of the edge to the edge 315 between the first node 311 and the second node 313 representing a number of co-occurrence times when the first item 321 and the second item 323 are viewed in sequence within the predetermined time interval.

At 406, as shown in FIG. 4C, recommendation engine 143 can adjust the initial weight 419 of the edge to remove bias to derive a normalized weight 421 of the edge based on the initial weight 419 of the edge, the initial node weight 411 of the first node, and the initial node weight 413 of the second node. In some embodiments, the normalized weight 421 of the edge can be calculated based on a formula: the normalized weight of the edge=(the initial weight of the edge*the initial weight of the edge)/(the initial node weight of the first node*the initial node weight of the second node). The use of the normalized weight 421 of the edge can reduce the popularity bias.

In addition, as shown in FIG. 4D, recommendation engine 143 can adjust the initial node weight 413 of the second node to derive an adjusted node weight 433 of the second node based on a predetermined watching history context factor and the normalized weight 421 of the edge between the first node 311 and the second node 313 to take into consideration of the context of the second node 313. In some embodiments, the adjusted node weight 433 of the second node 313 can be derived based on a formula: the adjusted node weight of the second node=the initial node weight of the second node*the predetermined watching history context factor+the normalized weight of the edge from the first node to the second node*(1−the predetermined watching history context factor). Similarly, the first node 311 can have an adjusted node weight 431 calculated in a similar manner. By adjusting the initial node weight 413 to the adjusted node weight 433 to take into consideration of the context factor, various bias can be reduced since the context factor can reflect the connections of individual user interests accumulated over time.

At 408, as shown in FIG. 3, for the current item 113 being viewed by the user account 141 represented by the current node 317 of the co-watch graph 151, recommendation engine 143 can select, based on the co-watch graph 151 with the edge having the normalized weight, the recommended item 115 represented by an associated node 337 in the co-watch graph 151 likely being viewed by the user account 141, and determine a probability of the recommended item 115 likely being viewed.

In some embodiments, to select the recommended item 115 based on the co-watch graph 151, recommendation engine 143 can generate an ordered sequence of nodes 341 of the co-watch graph 151 coupled to the current node 317, where each node 339 of the ordered sequence of nodes 341 represents a corresponding item 343 being viewed by the user account 141, and the each node 339 of the ordered sequence of nodes 341 has an adjusted node weight based on a context of the each node 339 and the predetermined watching history context factor, which is demonstrated in FIG. 4D. In some embodiments, the ordered sequence of nodes 341 can be generated by a deep walk algorithm based on the context of the current node 317. Conventionally, a deep walk algorithm is based on a last node of the current node to generate the next node. In some embodiments, based on the context of the current node 317, the adjusted weight of the last node of the current node 317, and the adjusted weight of nodes along the path to the current node 317 are used to perform the deep walk algorithm. Embodiments herein can prevent the ordered sequence of nodes 341 from drifting too far from the user's current interest. As known to one having the ordinary skills of the art, a deep walk algorithm can include two main components, a random walk generator and an update procedure. A walk samples uniformly from the neighbors of the last node visited until a maximum length is reached. During the random walk, the next node can be selected with probabilities calculated based on the adjusted node weight. In some embodiments, besides the context based random walk presented above, one could build supervised training model based on weight of the edges, or use graph based model such as graph neural network (GNN) to derive embedding for the items as well.

In some embodiments, for the each node 339 of the ordered sequence of nodes 341, recommendation engine 143 can determine a probability of the corresponding item 343 likely being viewed by the user account 141 based on a corpus including a plurality of items being viewed by a plurality of additional user accounts 147. In some embodiments, recommendation engine 143 can determine the probability of the corresponding item 343 likely being viewed by the user account using a tool related to a w2v model. The w2v model, which can be referred to as Word2Vec model, is a combination of models used to represent distributed representations of words in a corpus. W2v model includes an algorithm that accepts text corpus as an input and outputs a vector representation for each word and its associated probabilities. When the w2v model is applied to the co-watch graph 151, the word is treated as the item identifier of a node in the co-watch graph 151. There can be at least two kinds of algorithms used in the w2v model, the skip-gram algorithm and the continuous bag of words (CBOW) algorithm. Details of the w2v model are known to one having ordinary skill in the art.

In some embodiments, recommendation engine 143 can select the recommended item 115 of the current item 113 as represented by a maximal node of the ordered sequence of nodes 341 having a maximal probability of likely being viewed by the user account 141 among the probability of the corresponding item of the each node of the sequence of nodes 341.

Example Computer System

Figure 5:
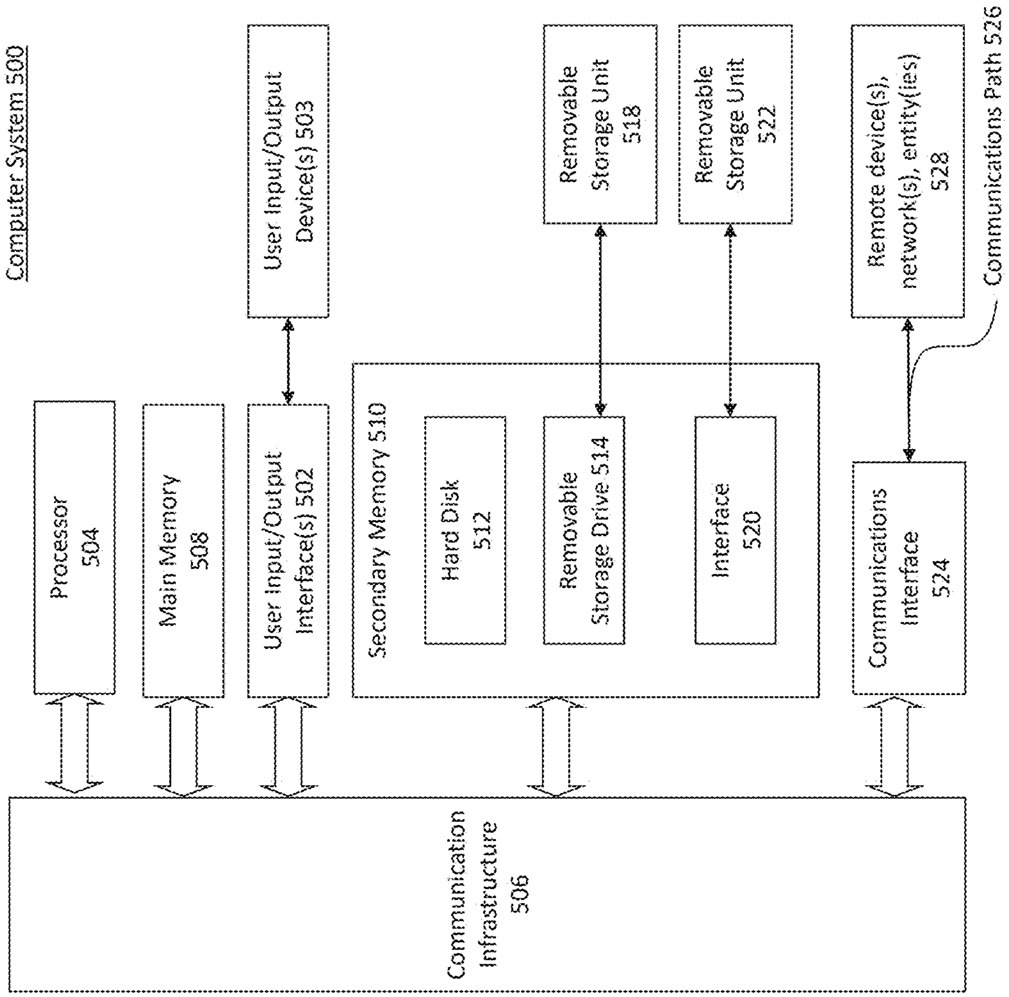
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, may be implemented using combinations or sub-combinations of computer system 500 to perform various functions described herein, e.g., by process 400. Also or alternatively, one or more computer systems 500 may be used, for example, to implement any of the embodiments discussed herein, such as server 120 and operations performed by server 120 as described in FIGS. 3, 4A-4D, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computing device, comprising:

one or more memories; and at least one processor each coupled to at least one of the memories and configured to perform operations comprising:

accessing a view history of a user account, the view history stored in and accessed from a storage device accessible by the at least one processor, the view history collected from a media device associated with the user account, the view history comprising at least a first item and a second item viewed by the user account in sequence within a predetermined time interval, the first item and the second item viewed on a display device associated with the media device, the storage device storing a plurality of view histories associated with a plurality of user accounts and collected from a plurality of media devices, the plurality of user accounts including the user account and a plurality of additional user accounts;

generating a co-watch graph based on the view history of the user account, wherein the co-watch graph comprises a plurality of nodes including a first node corresponding to the first item viewed by the user account, a second node corresponding to the second item viewed by the user account, and an edge between the first node and the second node;

for a current item being viewed by the user account represented by a current node of the co-watch graph, selecting, based on the co-watch graph, a recommended item represented by an associated node in the co-watch graph, wherein the selecting the recommended item comprises:

generating an ordered sequence of nodes of the co-watch graph coupled to the current node, wherein:

each respective node of the ordered sequence of nodes represents a corresponding item being viewed by the user account, each respective node of the ordered sequence of nodes has an adjusted node weight respectively based on a context of the respective node and a predetermined watching history context factor, and at least one pair of nodes in the ordered sequence of nodes has an ordered-pair edge between a first ordered node of the pair of nodes and a second ordered node of the pair of nodes, a weight of the ordered-pair edge representing a number of co-occurrence times that a first item represented by the first ordered node and a second item represented by the second ordered node have been viewed in sequence within the predetermined time interval, the weight of the ordered-pair edge being adjusted to remove bias;

for each respective node of the ordered sequence of nodes, determining a corresponding probability of the corresponding item being viewed by the user account based on a corpus including a plurality of items viewed by a plurality of additional user accounts; and selecting the recommended item as represented by a maximal node of the ordered sequence of nodes having a maximal probability of being viewed by the user account among the probabilities of the corresponding items of each respective node of the ordered sequence of nodes;

determining a probability that the recommended item will be viewed by the user account as the maximal probability of being viewed by the user account; and commanding the media device to display the recommended item on the display device based on the selection of the recommended item.

2. The computing device of claim 1, wherein the predetermined time interval is a two hour time window.

3. The computing device of claim 1, wherein the user account is shared among multiple users, the view history of the user account is a collection of a view history of each user of the multiple users, and the first item viewed by the user account is viewed by any user of the multiple users.

4. The computing device of claim 1, wherein the operations further comprise adjusting the weight of the ordered-pair edge as a normalized weight of the ordered-pair edge based on a formula: the normalized weight of the ordered-pair edge=(an initial weight of the ordered-pair edge*the initial weight of the ordered-pair edge)/(an initial node weight of the first ordered node*an initial node weight of the second ordered node).

5. The computing device of claim 1, wherein the first ordered node is the first node corresponding to the first item viewed by the user account, the second ordered node is the second node corresponding to the second item viewed by the user account, the first item is viewed by the user account before the second item is viewed by the user account, the first node is a part of a context of the second node, and the operations further comprise:

adjusting an initial node weight of the second ordered node to derive an adjusted node weight of the second ordered node based on a predetermined watching history context factor and a normalized weight of the ordered-pair edge between the first ordered node and the second ordered node to take into consideration the context of the second ordered node.

6. The computing device of claim 5, wherein the operations further comprise:

deriving the adjusted node weight of the second ordered node based on a formula: the adjusted node weight of the second ordered node=an initial node weight of the second ordered node*the predetermined watching history context factor+the normalized weight of the ordered-pair edge between the first ordered node and the second ordered node*(1−the predetermined watching history context factor).

7. The computing device of claim 1, wherein the generating the ordered sequence of nodes of the co-watch graph coupled to the current node comprises generating the ordered sequence of nodes by a deep walk algorithm based on the context of the current node.

8. A computer-implemented method, comprising:

accessing, by at least one computer processor, a view history of a user account, the view history stored in and accessed from a storage device accessible by the at least one computer processor, the view history collected from a media device associated with the user account, the view history comprising at least a first item and a second item viewed by the user account in sequence within a predetermined time interval, the first item and the second item viewed on a display device associated with the media device, the storage device storing a plurality of view histories associated with a plurality of user accounts and collected from a plurality of media devices, the plurality of user accounts including the user account and a plurality of additional user accounts;

generating a co-watch graph based on the view history of the user account, wherein the co-watch graph comprises a plurality of nodes including a first node corresponding to the first item viewed by the user account, a second node corresponding to the second item viewed by the user account, and an edge between the first node and the second node;

for a current item being viewed by the user account represented by a current node of the co-watch graph, selecting, based on the co-watch graph, a recommended item represented by an associated node in the co-watch graph, wherein the selecting the recommended item comprises:

generating an ordered sequence of nodes of the co-watch graph coupled to the current node, wherein:

each respective node of the ordered sequence of nodes represents a corresponding item being viewed by the user account, each respective node of the ordered sequence of nodes has an adjusted node weight respectively based on a context of the respective node and a predetermined watching history context factor, and at least one pair of nodes in the ordered sequence of nodes has an ordered-pair edge between a first ordered node of the pair of nodes and a second ordered node of the pair of nodes, a weight of the ordered-pair edge representing a number of co-occurrence times that a first item represented by the first ordered node and a second item represented by the second ordered node have been viewed in sequence within the predetermined time interval, the weight of the ordered-pair edge being adjusted to remove bias;

for each respective node of the ordered sequence of nodes, determining a corresponding probability of the corresponding item being viewed by the user account based on a corpus including a plurality of items viewed by a plurality of additional user accounts; and selecting the recommended item as represented by a maximal node of the ordered sequence of nodes having a maximal probability of being viewed by the user account among the probabilities of the corresponding items of each respective node of the ordered sequence of nodes;

determining a probability that the recommended item will be viewed by the user account as the maximal probability of being viewed by the user account; and commanding the media device to display the recommended item on the display device based on the selection of the recommended item.

9. The computer-implemented method of claim 8, wherein the predetermined time interval is a two hour time window.

10. The computer-implemented method of claim 8, wherein the user account is shared among multiple users, the view history of the user account is a collection of a view history of each user of the multiple users, and the first item viewed by the user account is viewed by any user of the multiple users.

11. The computer-implemented method of claim 8, further comprising adjusting the weight of the ordered-pair edge as a normalized weight of the ordered-pair edge based on a formula: the normalized weight of the ordered-pair edge=(an initial weight of the ordered-pair edge*the initial weight of the ordered-pair edge)/(an initial node weight of the first ordered node*an initial node weight of the second ordered node).

12. The computer-implemented method of claim 8, wherein the first ordered node is the first node corresponding to the first item viewed by the user account, the second ordered node is the second node corresponding to the second item viewed by the user account, the first item is viewed by the user account before the second item is viewed by the user account, the first node is a part of a context of the second node, and the computer-implemented method further comprises:

adjusting an initial node weight of the second ordered node to derive an adjusted node weight of the second ordered node based on a predetermined watching history context factor and a normalized weight of the ordered-pair edge between the first ordered node and the second ordered node to take into consideration the context of the second ordered node.

13. The computer-implemented method of claim 12, further comprising:

deriving the adjusted node weight of the second ordered node based on a formula: the adjusted node weight of the second ordered node=an initial node weight of the second ordered node*the predetermined watching history context factor+the normalized weight of the ordered-pair edge between the first ordered node and the second ordered node*(1−the predetermined watching history context factor).

14. The computer-implemented method of claim 8, wherein the generating the ordered sequence of nodes of the co-watch graph coupled to the current node comprises generating the ordered sequence of nodes by a deep walk algorithm based on the context of the current node.

15. A non-transitory computer-readable medium having instructions stored thereon that, when executed by at least one computing device, cause the at least one computing device to perform operations comprising:

accessing a view history of a user account, the view history stored in and accessed from a storage device accessible by the at least one computing device, the view history collected from a media device associated with the user account, the view history comprising at least a first item and a second item viewed by the user account in sequence within a predetermined time interval, the first item and the second item viewed on a display device associated with the media device, the storage device storing a plurality of view histories associated with a plurality of user accounts and collected from a plurality of media devices, the plurality of user accounts including the user account and a plurality of additional user accounts;

generating a co-watch graph based on the view history of the user account, wherein the co-watch graph comprises a plurality of nodes including a first node corresponding to the first item viewed by the user account, a second node corresponding to the second item viewed by the user account, and an edge between the first node and the second node;

for a current item being viewed by the user account represented by a current node of the co-watch graph, selecting, based on the co-watch graph, a recommended item represented by an associated node in the co-watch graph, wherein the selecting the recommended item comprises:

generating an ordered sequence of nodes of the co-watch graph coupled to the current node, wherein:

each respective node of the ordered sequence of nodes represents a corresponding item being viewed by the user account, each respective node of the ordered sequence of nodes has an adjusted node weight respectively based on a context of the respective node and a predetermined watching history context factor, and at least one pair of nodes in the ordered sequence of nodes has an ordered-pair edge between a first ordered node of the pair of nodes and a second ordered node of the pair of nodes, a weight of the ordered-pair edge representing a number of co-occurrence times that a first item represented by the first ordered node and a second item represented by the second ordered node have been viewed in sequence within the predetermined time interval, the weight of the ordered-pair edge being adjusted to remove bias;

for each respective node of the ordered sequence of nodes, determining a corresponding probability of the corresponding item being viewed by the user account based on a corpus including a plurality of items viewed by a plurality of additional user accounts; and selecting the recommended item as represented by a maximal node of the ordered sequence of nodes having a maximal probability of being viewed by the user account among the probabilities of the corresponding items of each respective node of the ordered sequence of nodes;

determining a probability that the recommended item will be viewed by the user account as the maximal probability of being viewed by the user account; and commanding the media device to display the recommended item on the display device based on the selection of the recommended item.

16. The non-transitory computer-readable medium of claim 15, wherein the predetermined time interval is a two hour time window.

17. The non-transitory computer-readable medium of claim 15, wherein the user account is shared among multiple users, the view history of the user account is a collection of a view history of each user of the multiple users, and the first item viewed by the user account is viewed by any user of the multiple users.

18. The non-transitory computer-readable medium of claim 15, wherein the operations further comprise adjusting the weight of the ordered-pair edge as a normalized weight of the ordered-pair edge based on a formula: the normalized weight of the ordered-pair edge=(an initial weight of the ordered-pair edge*the initial weight of ordered-pair the edge)/(an initial node weight of the first ordered node*an initial node weight of the second ordered node).

19. The non-transitory computer-readable medium of claim 15, wherein the first ordered node is the first node corresponding to the first item viewed by the user account, the second ordered node is the second node corresponding to the second item viewed by the user account, the first item is viewed by the user account before the second item is viewed by the user account, the first node is a part of a context of the second node, and the operations further comprise:

adjusting an initial node weight of the second ordered node to derive an adjusted node weight of the second ordered node based on a predetermined watching history context factor and a normalized weight of the ordered-pair edge between the first ordered node and the second ordered node to take into consideration the context of the second ordered node.

20. The non-transitory computer-readable medium of claim 19, wherein the operations further comprise:

deriving the adjusted node weight of the second ordered node based on a formula: the adjusted node weight of the second ordered node=an initial node weight of the second ordered node*the predetermined watching history context factor+the normalized weight of the ordered-pair edge between the first ordered node and the second ordered node*(1−the predetermined watching history context factor).

* * * * *